United States Patent [19]
Vanhoof et al.

[11] 3,917,628
[45] Nov. 4, 1975

[54] NEW DERIVATIVES OF 1,4-BENZODIOXAN, THE PREPARATION AND THE USE THEREOF

[75] Inventors: Pierre M. Vanhoof; Pierre M. Clarebout, both of Brussels, Belgium

[73] Assignee: A. Christiaens, Societe Anonyme, Brussels, Belgium

[22] Filed: Sept. 25, 1973

[21] Appl. No.: 400,605

[30] Foreign Application Priority Data
Sept. 26, 1972  United Kingdom............... 44435/72

[52] U.S. Cl............. 260/296 B; 424/263; 424/267; 424/274; 260/293.58; 260/326.36; 260/326.5 D
[51] Int. Cl.²............... C07D 211/26; C07D 213/46
[58] Field of Search........ 260/340.3, 296 B, 293.58, 260/326.36, 326.5 D

[56] References Cited
UNITED STATES PATENTS

| | | | |
|---|---|---|---|
| 2,695,294 | 11/1954 | Swain | 260/340.3 X |
| 2,695,295 | 11/1954 | Swain | 260/340.3 X |
| 2,725,386 | 11/1955 | Bovet et al | 260/340.3 |

FOREIGN PATENTS OR APPLICATIONS
1,005,028   9/1965   United Kingdom.............. 260/340.3

OTHER PUBLICATIONS
Banziger et al., J. Am. Pharm. Assoc. Vol. 44, pp. 302 to 305 (1955).

*Primary Examiner*—John D. Randolph
*Attorney, Agent, or Firm*—Sughrue, Rothwell, Mion, Zinn & Macpeak

[57] ABSTRACT

This invention relates to new derivatives of 1,4-benzodioxan, namely 2-[N-($R_1$, $R_2$-aminoalkyl or aminoalkanoyl)-N-phenyl or 2-pyridyl aminomethyl]-1,4-benzodioxans, in which $R_1$ is hydrogen or a lower alkyl radical and $R_2$ is a lower alkyl radical, whereby $R_1$ and $R_2$ may also form with the attached nitrogen atom a nitrogenous heterocyclic ring, as well as the acid addition salts of said new derivatives.

The new compounds are valuable therapeutic agent for the treatment of heart arrhythmy.

11 Claims, No Drawings

NEW DERIVATIVES OF 1,4-BENZODIOXAN, THE PREPARATION AND THE USE THEREOF

SUMMARY OF THE INVENTION

This invention relates to new derivatives of 1,4-benzodioxan, as well as to the preparation and use of said new derivatives.

The new derivatives of 1,4-benzodioxan according to this invention may be represented by the following general formula:

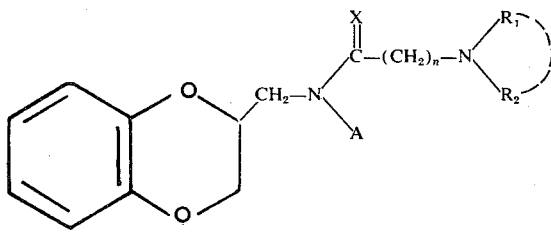

(I)

in which $n = 1$ or 2, X represents two hydrogen atoms or one oxygen atom, $R_1$ and $R_2$ represent a lower alkyl group containing 1 to 4 carbon atoms or form together with the attached nitrogen atom a nitrogenous heterocyclic ring, with the priviso that $R_1$ may also represent hydrogen and A represents a phenyl or 2-pyridyl group, as well as the acid addition salts of said compounds of formula (I).

This invention relates therefore also to pharmaceutical compositions containing, as active ingredient, at least one compound of the general formula I, together with a pharmaceutically acceptable carrier.

This invention relates also to processes for preparing the compounds of formula I.

DETAILED DESCRIPTION OF THE INVENTION

The preferred compounds of the formula I are those in which $R_1$ and $R_2$ represent a methyl, ethyl, propyl or isopropyl group and those in which $R_1$ represents hydrogen and $R_2$ represents a methyl, ethyl, propyl or isopropyl group, as well as the acid addition salts thereof, such as the hydrochlorides, furmarates, etc.

The new compounds according to this invention have interesting pharmacological properties. They can be used for the treatment of heart arrhythmia.

It has surprisingly been found that the components of the general formula I are very active for the treatment of heart arrhythmia.

Said compounds can be used for the treatment of various heart diseases such as premature heart contractions, ventricular and surpraventricular tachycardias either idiopathic or subsequent to a cardiopathia or to a coronary disease, cardiac arrhythmias due to digitalin intoxication, as well as atrial fibrillation and flutter, particularly in the early stage.

It is known (see Koch-Weser, J. Arch. Int. Med. 129; 763, 1972) that none of the presently available antiarrhythmic agents are satisfactory for the prophylaxis of tachycardias and fibrillation of ventricular origin.

The oral activity of the known antiarrhythmic agents, such as procainamide or lidocaine, is either too short leading to multiple day and night administration (for example with procainamide) or too low to be of some practical utility (for example with lidocaine) of their therapeutic activity is conjugated with frequent and dangerous side effects, such as hypotension (with procainamide), sudden death, agranulocytosis or idiosyncrasy.

The compounds of general formula I according to this invention are very active when orally administered, although they may also be administered parenterally. They have also a long activity duration and are not depressant for the myocardial function.

Applicants do not known any orally active antiarrhythmic agent which does not act at the same time as a depressant of the myocardial function.

The oral antiarrhythmic activity of the compounds of formula I has been proved by tests on rats using aconitine which is a compound causing premature heart contractions and death of the animals.

The method used for these tests is described hereafter:

Animals

Male or female rats with a body-weight ranging from 380 to 450 g.

Aconitine solution 3.12 µg aconitine nitrate/1 ml physiological saline.

Solution of the compound to be tested 0.75 % in distilled water.

Method

Six random selected animals are required for each compound to be tested. The compound is administered by oral route at the dose of 75 mg/kg (1 ml of the 0.75 % solution/100 g of body weight) 75 minutes before the intraveinous perfusion of the aconitine solution is initiated. Control groups of animals are treated only with distilled water (1 ml/100 g).

Sixty minutes after the administration of the compound to be tested, the animals are anesthesized by an intraperitoneal injection of Pentobarbital (50 mg/kg) and the jugular vein is dissected.

A catheter is introduced in the vein and fixed by a ligature. The ECG (D II derivation) is then continuously recorded. The perfusion of the aconitine solution is started 75 minutes after the administration of the compound to be tested. The volume delivered by the injection device being 0.287 mg/minute, the dose of aconitine nitrate administered is 0.895 µg/minute (0.20 – 0.24 µg/100 g/min. according to the minimal and maximal weight of the animals). The experience is stopped as soon as the first extrasystoles are appearing and the time elapsed from the beginning of the perfusion is noted. The results are expressed as the mean total dose of aconitine injected in a group of animals.

The relative activity between a tested compound and a reference substance (lidocaine, procainamide) is computed in the following way:

$$A(x) = \frac{X - C}{R - C} \times 100$$

where $A(x)$ = activity of tested compound X (in %)

$\overline{X}$ = mean dose of aconitine in the animals treated by compound X $\overline{C}$ = mean dose of aconitine injected in the untreated animals (controls)

$\overline{R}$ = mean dose of aconitine injected in the animals treated by the reference substances.

The following table gives the results of the evaluation of the antiarrhythmic activity by oral route of a great number of acid addition salts of compounds of formula I compared to the activity of two well known antiarrhythmic agents (procainamide and lidocaine).

TABLE

| | COMPOUNDS OF FORMULA I | | | | % ACTIVITY | VERSUS |
|---|---|---|---|---|---|---|
| A | | n | X | $N\langle{}^{R_1}_{R_2}$ | LIDOCAINE | PROCAINAMIDE |
| phenyl | | 1 | $H_2$ | N-dimethyl | 228 | 291 |
| phenyl | | 1 | $H_2$ | N-diethyl | 858 | 1094 |
| phenyl | | 1 | $H_2$ | piperidino | 252 | 322 |
| phenyl | | 1 | $H_2$ | pyrrolidino | 215 | 274 |
| phenyl | | 1 | O | NH-methyl | 782 | 998 |
| phenyl | | 2 | $H_2$ | NH-ethyl | 347 | 443 |
| phenyl | | 2 | $H_2$ | N-dimethyl | 417 | 533 |
| phenyl | | 2 | $H_2$ | N-diethyl | 915 | 1168 |
| phenyl | | 2 | $H_2$ | N-dipropyl | 521 | 665 |
| phenyl | | 2 | O | NH-methyl | 1696 | 2164 |
| phenyl | | 2 | O | NH-ethyl | 1400 | 1786 |
| phenyl | | 2 | O | N-dimethyl | 1676 | 2140 |

The compounds of the formula I may be administered orally or parenterally.

Oral preparations may be administered under the form of capsules, tablets, pills and the like. Each capsule, tablet or pill may contain from 10 to 200 mg of a compound of formula I as active ingredient, together with pharmaceutically acceptable excipients or carriers.

Parenteral preparations may consist in a solution for perfusion or for intraveinous or intramuscular injection. Such a solution may contain 0.2 per thousand to 2 per thousand of a compound of formula I.

The parenteral preparation may be either a solution which may be directly used for the perfusion and contains a proportion of the active ingredient within the above limits, or a concentrated solution containing 1 to 10 % of the active ingredient, said concentrated solution being diluted when administered to a patient.

The initial dose of active ingredient may be of 200 to 800 mg per day during 2 or 3 days, the maintenance dose being of about 25 mg to 300 mg per day.

If a single dose is sufficient for obtaining the therapeutic effect, this dose is generally comprised between 50 and 300 mg.

The active ingredient may be administered at the same time by the parenteral route (for example by perfusion) and by oral route.

In the various processes according to this invention described hereinafter, the compounds of formula I are prepared from a 2-( A-aminomethyl)-1,4-benzodioxan of the following formula:

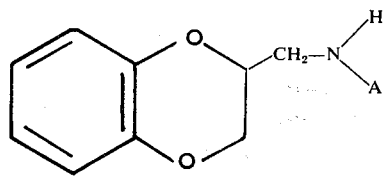

(II)

in which A has the above meaning.

According to this invention, the compounds of formula I may be prepared by a first process involving the following steps:

1. Reaction of a 2-(A-aminomethyl)1,4-benzodioxan of the formula (II) with sodium amide so as to obtain the sodium salt of said compound of formula (II);

2. Reaction of the sodium salt of the compound of formula (II) with a halogenated amine of the formula:

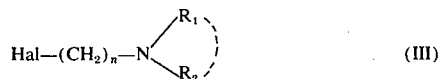

(III)

in which Hal represents a halogen atom, whereas $n$, $R_1$ and $R_2$ have the above meanings, so as to obtain a compound of formula (I).

According to this invention, the compounds of formula (I) may also be prepared by a second process involving the following steps:

1. Acylation of a 2-(A-aminomethyl)-1,4-benzodioxan of the formula (II) by means of a chloride of a halogenated aliphatic acid of the formula:

(IV)

in which Hal represents a halogen atom and n' = 1 or 2, so as to obtain a 2-((N-haloalkanoyl-N-A-aminomethyl)-1,4-benzodioxan of the formula:

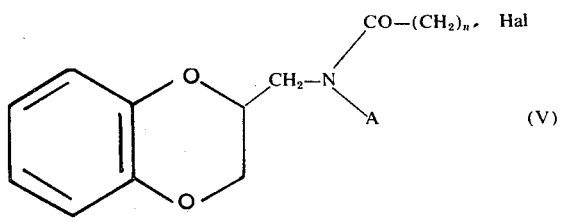

(V)

2. Reaction of the 2-(N-haloalkanoyl-N-A-aminomethyl)-1,4-benzodioxan of the formula (V) with an amine of the formula:

 (VI)

in which $R_1$ and $R_2$ have the above meanings, so as to obtain a N-alkylated derivative of the following formula:

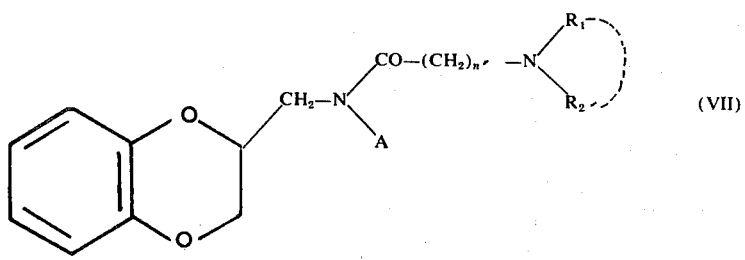 (VII)

3. Reduction of the compound of formula VII by means of lithium aluminum hydride ($AlLiH_4$) in ether so as to obtain a compound of the formula (I), wherein $X = H_2$.

The amine of formula (VI) used in the second step of the above process may be a primary of secondary amine.

A primary amine of the formula $H_2NR_2$ is used, when a compound of the formula (I), in which $R_1$ represents hydrogen whereas $R_2$ represents a lower alkyl group has to be prepared.

A secondary amine of the formula

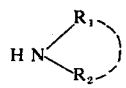

is used, when a compound of the formula (I) in which $R_1$ and $R_2$ each represent a lower alkyl group or form together with the attached nitrogen atom a heterocyclic nitrogenous ring, such as morpholino, piperidino, pyrrolidino or piperazino ring, has to be prepared.

According to this invention, the compounds of formula (I) may also be prepared by a third process involving the following steps 1. Reaction of a 2-(A-aminomethyl)-1,4-benzodioxan of the formula (II) with a dihalogenated hydrocarbon of the formula

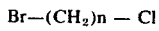 (VIII)

in which $n = 1$ or 2, so as to obtain a compound of the formula:

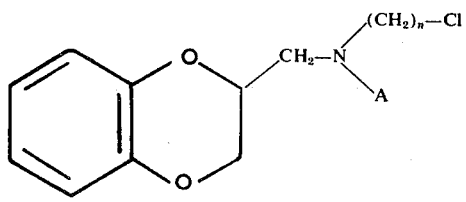 (IX)

2. Reaction of the obtained compound of the formula (IX) with an amine of the formula (VI).

The 2-(N-A-aminomethyl)-1,4-benzodioxans of the formula (II) may be prepared from a 2-hydroxymethyl-1,4-benzodioxan of the formula:

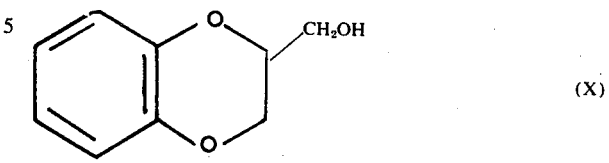 (X)

The compound of formula (X) may be prepared by known methods described by J. Koo, S. Avakian and G.T. Martin in J.A.C.S., 77, 5373 (1955) or by V. Rosnati and F. De Marchi in TETRAHEDRON, 1962, vol. 18, pages 289 – 298.

The method for obtaining a 2-(N-A-aminomethyl)-1,4-benzodioxan of the formula (II) from a 2-(N-A-aminomethyl)-1,4-benzodioxan of the formula (II) from a 2-hydroxymethyl-1,4-benzodioxan of the formula (X) involves the following steps:

1. Reaction of 2-hydroxymethyl-1,4-benzodioxan of the formula (VIII) with the methane sulfonic acid chloride, so as to obtain the mesylate of 2-hydroxymethyl-1,4-benzodioxan of the formula:

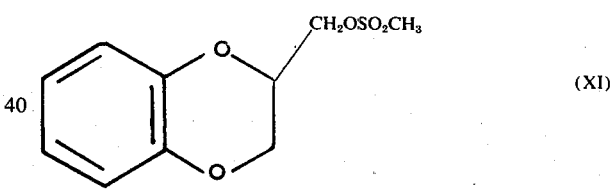 (XI)

2. Reaction of the mesylate of formula (XI) with aniline or 2-aminopyridine so as to obtain the 2-(N-A-aminomethyl)-1,4-benzodioxan of the formula (II).

EXAMPLES

The Examples 1 to 15 illustrate the preparation of compounds of formula (I).

EXAMPLE 1

Preparation of the fumarate of 2-[N-(γ-diethylaminopropyl)-N-phenylaminomethyl]-1,4-benzodioxan a. Preparation of mesylate of 2-hydroxymethyl-1,4-benzodioxan (formula IX).

6.9 grams (0.041 mole) of 2-hydroxymethyl-1,4-benzodioxan are dissolved in 6.9 grams of anhydrous pyridine. The solution is cooled to 0°C. 5.61 grams (0.049 mole) of mesyl chloride are then added drop by drop within 20 minutes, while maintaining the temperature at 0°C during the addition. The reaction mixture is then allowed to return to the room temperature and is mixed at this temperature during 30 minutes. The mixture is then poured on ice and extracted with ether. After drying of the ether extracts on magnesium sulfate, the ether is evaporated. 9.5 grams of mesylate are obtained. The product is recrystallized from ether; M.P. 53°–54°C.

| Analysis: | C | H | S |
|---|---|---|---|
| % calculated: | 49.18 | 4.95 | 13.10 |
| % found: | 49.0 | 4.8 | 13.25 | b. Preparation of 2-(phenylaminomethyl)-1,4-benzodioxan (formula II : A = phenyl)

9.5 grams of the mesylate (0.04 mole) and 14.9 grams (0.16 mole) of aniline are mixed and gradually heated to 150°C this temperature being maintained during 30 minutes. A precipitate of aniline mesylate is formed. After cooling and addition of 50 ml of ether, the aniline mesylate is filtered off. This ether is then removed from the filtrate and the excess of aniline is distilled. By distilling the residue, 7.4 grams (yield : 77%) of on oil distilling at 163°C (0.3 mm) are obtained.

Since this oil does not crystallise, it is dissolved in 50 ml of anhydrous ethanol, whereafter a stream of dry hydrochloric acid is passed through the obtained solution. The obtained hydrochloride is puified by crystallization from angydrous ethanol. Melting point: 191° – 193°C.

| Analysis: | C | H | N | Cl |
|---|---|---|---|---|
| % calculated: | 65.1 | 5.46 | 5.05 | 12.81 |
| % found: | 64.97 | 5.78 | 5.4 | 12.72 | c. Preparation of the fumarate of 2-[N-($\gamma$-diethylaminopropyl)-N-phenylaminomethyl]-1,4-benzodioxan (formula I; $R_1 = R_2 = -C_2H_5$, n = 2, X = $H_2$, A = phenyl)

6 grams (0.025 mole) of 2-(phenylam nomethyl)-1,4-benzodioxan, 1.87 grams (0.048 mole) of sodium amide and 125 ml of anhydrous benzene are stirred during 15 minutes under a nitrogen atmosphere and then refluxed during 30 minutes. 5.98 grams (0.04 mole) of $\gamma$-chloropropyldiethylamine are then added and the mixture is refluxed during 21 hours. After cooling, the reaction mixture is poured on ice and the benzene phase is decanted. This benzene phase is then extracted by means of 1 N hydrochloric acid (50 ml). The obtained solution is made alkaline by means of ammonia, so as to release 6.98 grams of the desired amine which is extracted by means of 2.28 grams of fumaric acid and 100 ml of water. The solution obtained at 60°C is evaporated to dryness. The obtained residue is recrystallised from isopropanol. 8.44 grams of the fumarate are obtained. Melting point: 138 – 140°C

| Analysis: | C | H | N |
|---|---|---|---|
| % calculated: | 66.36 | 7.28 | 5.95 |
| % found: | 66.23 | 7.02 | 6.24 |

EXAMPLE 2

Preparation of the hydrochloride of 2-[N-($\beta$-diethylaminoethyl)-N-phenylamimomethyl]-1,4-benzodioxan (formula I: $R_1 = R_2 = -C_2H_5$; n = 1; X = $H_2$; A = phenyl)

By using the process described in example I, section C, using $\beta$-chloroethydiethylamine instead of $\gamma$-chloropropyldiethyl-amine and hydrochloric acid instead of fumaric acid, the desired hydrochloride is obtained. This compound melts at 143°–144°C after recrystallization from benzene.

| Analysis: | C | H | N | Cl |
|---|---|---|---|---|
| % calculated: | 66.91 | 7.75 | 7.43 | 9.4 |
| % found: | 66.90 | 6.80 | 7.55 | 9.46 |

EXAMPLE 3

Preparation of the hydrochloride of 2-[N-($\gamma$-dimethylaminopropyl)-N-phenylaminomethyl]-1,4-benzodioxan (formula I: $R_1 = R_2 = CH_3$; n = 2; X = $H_2$, A = phenyl).

By using the process described in example I, section C using $\gamma$-chloropropyldimethylamine instead of $\gamma$-chloropropydiethyl-amine and hydrochloric acid instead of fumaric acid, the desired hydrochloride is obtained. This compound melts at 132°–134°C after recrystallization from acetone.

| Analysis | C | H | N | Cl |
|---|---|---|---|---|
| % calculated: | 66.19 | 7.49 | 7.71 | 9.76 |
| % found: | 66.26 | 7.31 | 7.74 | 9.81 |

EXAMPLE 4

Preparation of the oxalate of 2-[N-($\gamma$-dipropylaminopropyl)-N-phenylaminomethyl]-1,4-benzodiaxan (formula I: $R_1 = R_2 -C_3H_7$; n = 2; X = $H_2$, A = phenyl)

By using the process described in example I, section C using $\gamma$-chloropropyldipropylamine instead of $\gamma$-chloropropyldiethylamine and oxalic acid instead of fumaric acid, the desired oxalate is obtained. This compound melts at 109°–111°C after recrystallization from a mixture of acetone and ether.

| Analysis: | C | H | N |
|---|---|---|---|
| % calculated: | 66.08 | 7.67 | 5.92 |
| % found: | 66.20 | 7.60 | 5.96 |

EXAMPLE 5

Preparation of the hydrochloride of 2-[N-($\beta$-dimethylaminoethyl)-N-phenylaminomethyl]-1,4-benzodioxan (formula I: $R_1 = R_2 = CH_3$; n = 1, X = $H_2$, A = phenyl)

By using the process described in example I, section C using $\beta$-chloroethyldimethylamine instead of $\gamma$-chloropropyldiethylamine and hydrochloric acid instead of fumaric acid, the desired hydrochloride is obtained. This compound melts at 167°–170°C after recrystallization from a mixture of acetone and methanol.

| Analysis: | C | H | N | Cl |
|---|---|---|---|---|
| % calculated: | 65.41 | 7.22 | 8.02 | 10.16 |
| % found: | 65.65 | 7.22 | 8.05 | 10.18 |

EXAMPLE 6

Preparation of the hydrochloride of 2-[N-(β-piperidinoethyl)-N-phenylaminomethyl]-1,4-benzodioxan

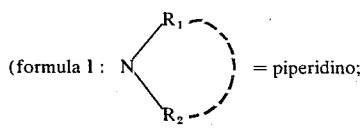

(formula 1: $N\langle {}^{R_1}_{R_2}\rangle$ = piperidino;

n = 1, X = H$_2$; A = phenyl)

By using the process described in example I, section C using N-β-chloroethylpiperidine instead of γ-chloropropyldiethylamine and hydrochloric acid instead of fumaric acid, the desired hydrochloride is obtained. This compound melts at 187°–188°C after recrystallization from benzene containing a little quantitiy of ethanol.

| Analysis: | C | H | N | Cl |
|---|---|---|---|---|
| % calculated: | 67.94 | 7.51 | 7.20 | 9.11 |
| % found: | 68.14 | 7.42 | 7.20 | 9.31 |

EXAMPLE 7

Preparation of the hydrochloride of 2-[N-(β-pyrrolidinoethyl)-N-phenylaminomethyl]-1,4-benzodioxan

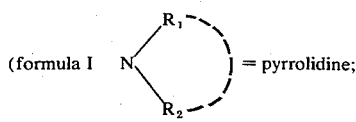

(formula I $N\langle {}^{R_1}_{R_2}\rangle$ = pyrrolidine;

n = 1; X = H$_2$; A = phenyl)

By using the process described in example I, section C using N-β-chloroethylpyrrolidine instead of γ-chloropropyldiethylamine and hydrochloric acid instead of fumaric acid, the desired hydrochloride is obtained. This compound melts at 168°–170°C after recrystallization from benzene containing a small amount of ethanol.

| Analysis: | C | H | N | Cl |
|---|---|---|---|---|
| % calculated: | 67.27 | 7.25 | 7.47 | 9.45 |
| % found: | 67.46 | 7.26 | 7.41 | 9.54 |

EXAMPLE 8

Preparation of the hydrochloride of 2-[N-(ethylaminoacetyl)-N-phenylaminomethyl]-1,4-benzodioxan (formula I: R$_1$ = H; R$_2$ = C$_2$H$_5$; X = O; n = 1, A = phenyl)

a. Preparation of 2-[N-chloroacetyl-N-phenylaminomethyl]-1,4-benzodioxan (formula V: n' = 1; Hal = Cl; A = phenyl)

1 mol of 2-(phenylaminomethyl)-1,4-benzodioxan (formula II) and 1.5 mols of chloroacetyl chloride are heated to the boiling temperature during 4 hours in 2.4 liters of benzene.

The solvent and the excess of the reagents is then evaporated. The oily residue is directly used in the following step.

b. Preparation of the hydrochloride of 2-[N-(ethylamino-acetyl)-N-phenylaminomethyl]-1,4-benzodioxan 10 g. of the compound obtained in section (a) of this example and 52.6 g of a 21% alcoholic solution of ethylamine are heated in an autoclave during 24 hours at 110°C. After cooling, the reaction medium is evaporated to dryness, 75 ml of 1 N coustic soda are added to the residue and the obtained solution is extracted by means of chloroform. The chloroform phase is dried on potassium carbonate. After removal of the solvent, the residue is treated with 100 ml of anhydrous ether and a stream of dry hydrochloric acid is bubbled in the ether solution at 0°C. A white solid precipitates. From the ether phase, a further amount of the desired product is recovered. By recrystallizing the solids from a mixture of acetone and methanol, the desired product melting at 188°–189°C is obtained.

| Analysis : | C | H | N | Cl |
|---|---|---|---|---|
| % calculated : | 62.89 | 6.38 | 7.72 | 9.77 |
| % found : | 62.69 | 6.34 | 7.54 | 9.88 |

EXAMPLE 9

Preparation of the hydrochloride of 2-[N-(methylaminoacetyl)-N-phenylaminomethyl]-1,4-benzodioxan (formula I: R$_1$ = H; R$_2$ = CH$_3$; X = 0,n = 1, A = phenyl)

This compound is obtained by amination of 2-[N-chloroacetyl-N-phenylaminomethyl]-1,4-benzodioxan (prepared in example 8, section a) by means of methylamine, in the manner described in example 8, section b).

After recrystallization from a mixture of acetone and methanol, the desired product melts at 154°–155°C

| Analysis : | C | H | N | Cl |
|---|---|---|---|---|
| % calculated : | 61.97 | 6.07 | 8.03 | 10.17 |
| % found : | 61.4 | 6.3 | 8.03 | 9.55 |

EXAMPLE 10

Preparation of the hydrochloride of 2-[N-(β-diethylaminopropionyl)-N-phenylaminomethyl]-1,4-benzodioxan (formula I: $R_1 = R_2 = C_2H_5$; X = 0; n = 2; A = phenyl)

a. Preparation of 2-[N-(β-chloropropionyl)-N-phenylaminomethyl]-1,4-benzodioxan (formula V: n' = 2, Hal = Cl ; A = phenyl).

This compound is prepared as described in example 8, section a, except that β-chloropropionyl chloride is used instead of chloroacetyl chloride. After recrystallization from petroleum ether (40°–60°C), the desired compound melts at 71°–72°C

| Analysis : | C | H | N | Cl |
|---|---|---|---|---|
| % calculated : | 65.16 | 5.46 | 4.21 | 10.61 |
| % found : | 65.25 | 5.40 | 4.17 | 10.77 | b. Preparation of the hydrochloride of 2-[N-(β-diethylaminopropionyl)-N-phenylaminomethyl]-1,4-benzodioxan 0.2 mol of the product obtained in section a of this example and 1.6 mols of diethylamine are heated in an antoclave at 110°C during 24 hours. By using then the process described in example 8, section b, the desired compound is obtained. After recrystallization from a mixture of acetone and methanol, said compound melts at 143°–144°C

| Analysis : | C | H | N | Cl |
|---|---|---|---|---|
| % calculated : | 65.25 | 7.21 | 6.91 | 8.75 |
| % found : | 64.72 | 7.12 | 7.41 | 9 |

EXAMPLE 11

Preparation of the hydrochloride of 2-[N-(ethylaminopropionyl)-N-phenylaminomethyl]-1,4-benzodioxan (formula I: $R_1$ = H; $R_2 = C_2H_5$; n = 2; X = 0; A = phenyl)

This compound is prepared as described in example 10, sections a and b using a 20 % alcoholic solution of ethylamine instead of diethylamine.

The obtained hydrochloride melts at 163°–165°C after recrystallization from acetone containing a small amount of methanol.

| Analysis : | C | H | N | Cl |
|---|---|---|---|---|
| % calculated : | 63.73 | 6.68 | 7.43 | 9.4 |
| % found : | 63.98 | 6.76 | 7.39 | 9.52 |

EXAMPLE 12

Preparation of the hydrochloride of 2-[N-(methylaminopropionyl)-N-phenylaminomethyl]-1,4-benzodioxan (formula I: $R_1$ = H; $R_2 = CH_3$; n = 2, X = 0; A = phenyl)

By using the method described in example 10, sections a and b, except that a 33 % alcoholic solution of methylamine is used, the desired hydrochloride melting at 142°–145°C after recrystallization from acetone is obtained.

| Analysis : | C | H | N | Cl |
|---|---|---|---|---|
| % calculated : | 62.89 | 6.38 | 7.71 | 9.77 |
| % found : | 62.26 | 6.21 | 7.71 | 9.86 |

EXAMPLE 13

Preparation of the hydrochloride of 2-[N-(γ-ethylaminopropyl)-N-phenylaminomethyl]-1,4-benzodioxan (formula I: $R_1$ = H; $R_2 = C_2H_5$; n = 2; X = $H_2$; A = phenyl)

a. Preparation of 2-[N-(γ-chloropropyl)-N-phenylaminomethyl]-1,4-benzodioxan (formula IX: n = 3; A = phenyl)

3.3 g. of 2-phenylaminomethyl-1,4-benzodioxan and 3 ml of 1.3-chlorobromopropane are stirred during 24 hours at 100°C. After removal of the excess of 1,3-chlorobromopropane, an oily residue is obtained.

b. Preparation of the hydrochloride of 2-[N-(γ-ethylaminopropyl)-N-phenylaminomethyl]-1,4-benzodioxan The product obtained in section a is heated during 24 hours in an autoclave at 110°C together with an excess of ethylamine and ethanol.

The method used in example 8, section b, is then used. The obtained hydrochloride melts at 114°–116°C after recrystallization from acetone.

| Analysis : | C | H | N | Cl |
|---|---|---|---|---|
| % calculated : | 66.19 | 7.49 | 7.71 | 9.76 |
| % found : | 65.95 | 7.34 | 7.58 | 9.72 |

EXAMPLE 14

Preparation of the oxalate of 2-[N-(γ-methylaminopropyl)-N-phenylaminomethyl]-1,4-benzodioxan (formula I: $R_1$ = H; $R_2 = CH_3$; X = $H_2$, n = 2; A = phenyl)

a. First method.

This compound is prepared by reaction of 2-phenylaminomethyl-1,4-benzodioxan with γ-bromopropylmethylamine in the presence of an excess of sodium amide using the method described in section a of example 1. 0.5 mol of 2-phenylaminomethyl-1,4-benzodioxan and 2.5 liters of benzene are introduced in a reaction vessel under an atmosphere of nitrogen. 0.95 mol of sodium amide are added and the mixture is stirred during 3 hours at room temperature 0.8 mol of γ-bromopropyl-methylamine are then quickly added. After agitation during 1 hour at room temperature, the reaction mixture is refluxed and stirred under nitrogen during 21 hours. The mixture is then allowed to cool and poured onto ice. The obtained aqueous phase is extracted by means of benzene. The benzene extract is washed with water and the benzene is evaporated.

The residue is treated with oxalic acid in a known manner. The obtained oxalate melts at 145°–148°C after recrystallization from a mixture of acetone and methanol.

| Analysis : | C | H | N |
|---|---|---|---|
| % calculated : | 62.67 | 6.51 | 6.96 |
| % found : | 62.3 | 6.4 | 6.79 | b. Second method.

The same compound is prepared by reduction of 2-[N-(methylaminopropionyl)-N-phenylaminomethyl]-1,4-benzodioxan by means of lithium aluminum hydride in ether.

A solution of 45 g of 2-[N-(methylaminopropionyl)-N-phenylaminomethyl]-1,4-benzodioxan in 1000 ml of ether is added drop by drop to a mixture of 500 ml of ether and 8.7 g of lithium aluminium hydride at room temperature. After this addition, the reaction mixture is refluxed during 2 hours.

By extraction by means of ether, a product is obtained which is converted into the desired oxalate.

EXAMPLE 15

Preparation of the oxalate of 2-[N-(γ-diethylaminopropyl)-N-(2-pyridyl)-1,4-benzodioxan (formula I: $R_1 = R_2 = C_2H_5$; $X = H_2$; $n = 2$, A =2-pyridyl)

a. Preparation of the hydrochloride of 2-[-(2'-aminopyridylmethyl-]1,4-benzodioxan (formula II; A = 2-pyridyl)

0.05 mole of 2-hydroxymethyl-1,4-benzodioxan mesylate 0.15 moles of 2-aminopyridine and 100 ml of xylene are refluxed during 4.5 hours under nitrogen.

After cooling, 100 ml of 3N NaOH are added and the obtained mixture is extracted with benzene. The organic phase is stirred with 200 ml of 2N hydrochloric acid. The precipitate is filtered and the residue of the evaporated filtrate is added to said precipitate.

The desired hydrochloride melts at 246°–247°C after recrystallization from water.

| Analysis : | C | H | N | Cl |
|---|---|---|---|---|
| % calculated : | 60.32 | 5.42 | 10.04 | 12.71 |
| % found : | 60.42 | 5.48 | 9.73 | 12.60 | b. Preparation of the oxalate of 2-[N-(γ-diethylaminopropyl)-N-(2-pyridyl)]-1,4-benzodioxan This compound has been prepared by the method described in section C of example 1.

The obtained oxalate melts with decomposition at 198°C

| Analysis : | of the oxalate [2(COOH)$_2$ + 2 H$_{20}$] | | |
|---|---|---|---|
| | C | H | N |
| % calculated : | 52.53 | 6.52 | 7.35 |
| % found : | 52.71 | 6.59 | 7.00 |

The following examples 16 to 19 illustrate pharmaceutical compositions according to this invention.

EXAMPLE 16

CAPSULE

| Active ingredient of formula I | 100 mg |
|---|---|
| Lactose | 120 mg |
| Rice starch | 30 mg |
| Corn starch | 30 mg |
| Colloidal silica | 1 mg |
| | for one capsule |

EXAMPLE 17

TABLET

| Active ingredient of formula I | 200 mg |
|---|---|
| Potato starch | 120 mg |
| Lactose | 80 mg |
| Starch sodium glycollate | 30 mg |
| Colloidal silica | 15 mg |
| Magnesium stearate | 5 mg |
| Hydroxy propylcellulose | 4 mg |
| Stearic acid | 2 mg |
| | for one tablet |

EXAMPLE 18

PILLS

| Core: | |
|---|---|
| Active ingredient of formula I | 50.0 mg |
| Lactose | 67.5 mg |
| Microcrystalline cellulose | 32.0 mg |
| Starch sodium glycollate | 8.2 mg |
| Colloidal silica | 0.4 mg |
| Magnesium stearate | 0.9 mg |
| Coating : | |
| Shellac | 1.0 mg |
| Sandarac | 0.2 mg |
| Castor oil | 0.3 mg |
| Gum arabic | 7.0 mg |
| Talc | 11.2 mg |
| Corn starch | 1.0 mg |
| Titanium oxide | 1.3 mg |
| Dyestuff | 4.0 mg |
| Sucrose | 142.8 mg |
| White wax/carnauba wax | 0.2 mg |
| | for one pill |

EXAMPLE 19

Solution for perfusion

| Active ingredient of formula I | 200 mg |
|---|---|
| Anhydrous sodium sulfite | 60 mg |
| Anhydrous sodium metabisulfite | 140 mg |
| Sodium chloride | 1.7 mg |
| Water for injection | ad 200 ml |

We claim:

1. A derivative of 1,4-benzodioxan of the general formula:

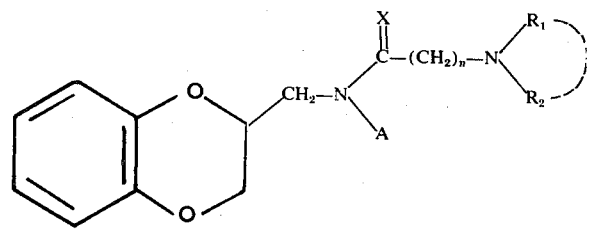

in which $n = 1$ or 2, X represents two hydrogen atoms or one oxygen atom, $R_1$ and $R_2$ represent each a lower alkyl group or form together with the attached nitrogen atom a nitrogenous heterocyclic ring selected from the group consisting of piperidino and pyrrolidino, with the priviso that $R_1$ may also represent hydrogen and A represents a phenyl or 2-pyridyl group, or a pharmaceutically acceptable acid addition salt of said compound of formula (I).

2. A derivative of 1,4-benzodioxan according to claim 1, in which A represents a phenyl group or a pharmaceutically acceptable acid addition salt thereof.

3. A derivative of 1,4-benzodioxan according to claim 1, in which X represents two hydrogen atoms or a pharmaceutically acceptable acid addition salt thereof.

4. A derivative of 1,4-benzodioxan according to claim 1, in which X represents one oxygen atom or a pharmaceutically acceptable acid addition salt thereof.

5. 2-[N-(β-diethylaminoethyl)-N-phenylaminomethyl]-1,4-benzodioxan, or a pharmaceutically acceptable acid addition salt thereof.

6. 2-[N-(γ-diethylaminopropyl)-N-phenylaminomethyl]-1,4-benzodioxan, or a pharmaceutically acceptable acid addition salt thereof.

7. 2-[N-(methylaminoacetyl)-N-phenylaminomethyl]-1,4-benzodioxan, or a pharmaceutically acceptable acid addition salt thereof.

8. 2-[N-(methylaminopropionyl)-N-phenylaminomethyl]-1,4-benzodioxan, or a pharmaceutically acceptable acid addition salt thereof.

9. 2-[N-(ethylaminopropionyl)-N-phenylaminomethyl]-1,4-benzodioxan, or a pharmaceutically acceptable acid addition salt thereof.

10. 2-[N-(β-dimethylaminopropionyl)-N-phenylaminomethyl]-1,4-benzodioxan, or a pharmaceutically acceptable acid addition salt thereof.

11. 2-[N-(γ-diethylaminopropyl)-N-(2-pyridyl)]-1,4-benzodioxan, or a pharmaceutically acceptable acid addition salt thereof.

* * * * *